United States Patent
Jacobsen et al.

(10) Patent No.: US 7,438,277 B2
(45) Date of Patent: Oct. 21, 2008

(54) FLOW FORCE COMPENSATED SLEEVE VALVE

(75) Inventors: Stephen C. Jacobsen, Salt Lake City, UT (US); Shane Olsen, Centerville, UT (US); Michael Morrison, West Jordan, UT (US)

(73) Assignee: Raytheon Sarcos, LLC, Salt Lake City, UT (US)

( * ) Notice: Subject to any disclaimer, the term of this patent is extended or adjusted under 35 U.S.C. 154(b) by 0 days.

(21) Appl. No.: 11/292,908

(22) Filed: Dec. 1, 2005

(65) Prior Publication Data

US 2006/0138379 A1 Jun. 29, 2006

Related U.S. Application Data

(60) Provisional application No. 60/633,249, filed on Dec. 2, 2004.

(51) Int. Cl.
*F16K 3/24* (2006.01)
(52) U.S. Cl. .................................. 251/340; 239/200
(58) Field of Classification Search ................ 251/340, 251/343, 347; 239/200, 203, 204, 586, 592, 239/598
See application file for complete search history.

(56) References Cited

U.S. PATENT DOCUMENTS

| | | | | |
|---|---|---|---|---|
| 1,401,097 A | * | 12/1921 | Nickolaus | .................... 251/145 |
| 2,610,780 A | * | 9/1952 | Bledsoe | ........................ 141/352 |
| 3,093,155 A | * | 6/1963 | Dawes | .......................... 251/340 |
| 3,643,685 A | * | 2/1972 | Hays | ........................... 251/340 |
| 3,799,199 A | | 3/1974 | Rumpff | |
| 3,834,388 A | * | 9/1974 | Sauer | .......................... 604/119 |
| 4,011,886 A | | 3/1977 | Wood | |
| 4,022,427 A | | 5/1977 | Read | |
| 4,036,248 A | | 7/1977 | Yoshimori et al. | |
| 4,080,982 A | * | 3/1978 | Maezawa | .................... 137/219 |
| 4,279,266 A | | 7/1981 | Knox et al. | |
| 4,397,442 A | | 8/1983 | Larkin | |
| 4,503,929 A | | 3/1985 | Farris et al. | |
| 4,511,116 A | | 4/1985 | Jackson | |
| 4,560,005 A | | 12/1985 | Helderle et al. | |
| 4,570,660 A | | 2/1986 | Chauvier | |
| 4,617,796 A | | 10/1986 | Knapp et al. | |
| 4,771,831 A | | 9/1988 | Pringle et al. | |
| 4,787,599 A | | 11/1988 | Nyboer | |
| 4,856,756 A | * | 8/1989 | Combs | ........................ 251/297 |
| 5,058,806 A | | 10/1991 | Rupar | |

(Continued)

*Primary Examiner*—John Fox
(74) *Attorney, Agent, or Firm*—Thorpe North & Western LLP

(57) ABSTRACT

The present invention features a sleeve valve comprising an elongate body having an outer surface and including a lumen for receiving a fluid and an associated fluid pressure therein and for defining a flow path of the fluid; at least one fluid flow port formed through the outer surface that is in fluid connection with the lumen; and a sleeve slidably disposed about the outer surface of the body and configured to displace across the fluid flow port to precisely regulate fluid emission through the fluid flow port. The sleeve and elongate body are operably related in a manner so as to provide some degree of fluid force compensation, such that the forces necessary to displace the sleeve across the fluid flow port are substantially unaffected by the fluid pressures acting within the body and at the fluid flow port. In other words, the fluid pressures do not substantially contribute to the resistance in the sleeve during actuation.

32 Claims, 9 Drawing Sheets

U.S. PATENT DOCUMENTS

| | | |
|---|---|---|
| 5,156,603 A | 10/1992 | Olsen |
| 5,211,241 A | 5/1993 | Mashaw, Jr. et al. |
| 5,248,126 A | 9/1993 | Pruss et al. |
| 5,448,962 A * | 9/1995 | Moody ................ 114/238 |
| 5,749,561 A | 5/1998 | Worthington |
| 5,979,492 A | 11/1999 | Miller |
| 6,602,055 B1 | 8/2003 | Thurto et al. |
| 6,629,648 B1 | 10/2003 | Jones |
| 6,736,332 B2 * | 5/2004 | Sesser et al. ................ 239/204 |
| 2003/0047702 A1 | 3/2003 | Gunnarsson et al. |
| 2003/0056951 A1 | 3/2003 | Kaszuba |
| 2003/0183392 A1 | 10/2003 | Garay et al. |

* cited by examiner

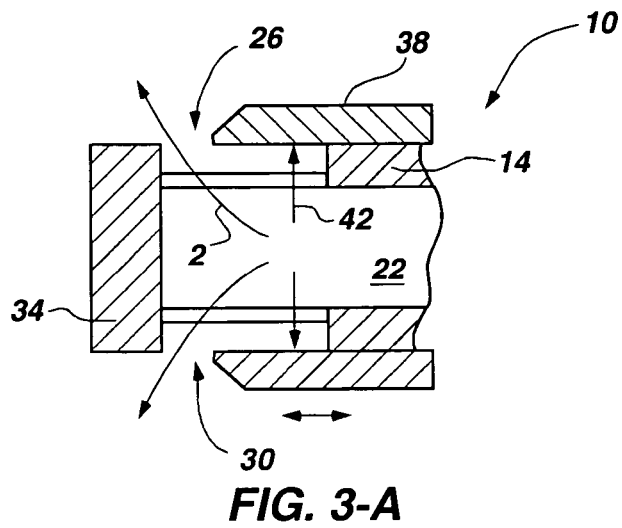
FIG. 3-A
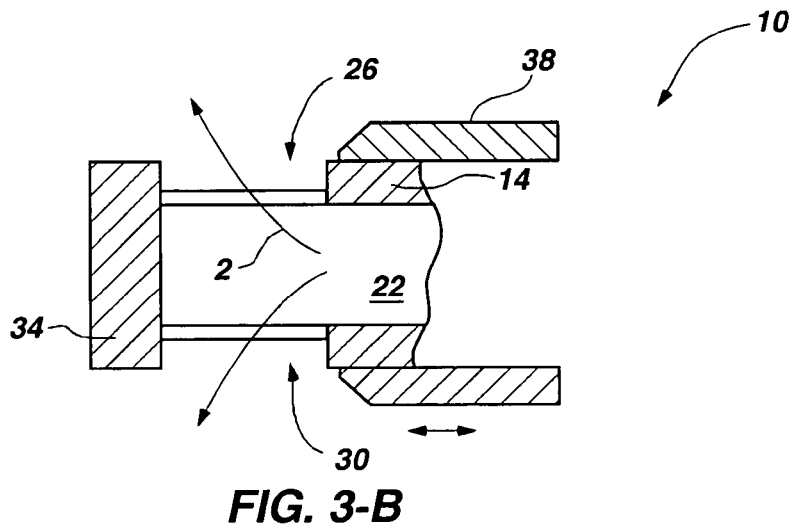
FIG. 3-B
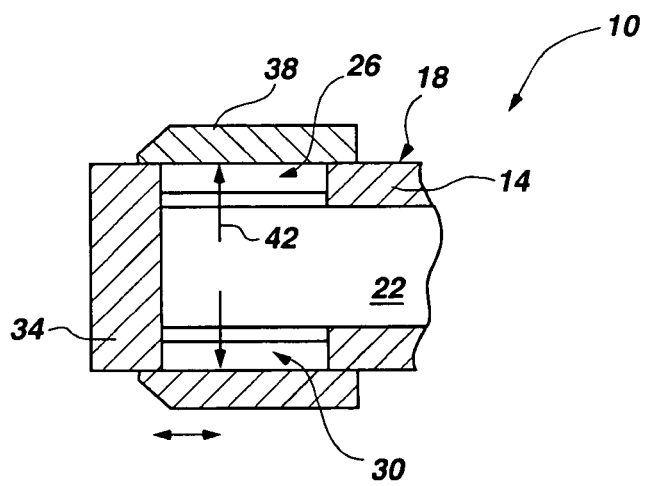
FIG. 3-C

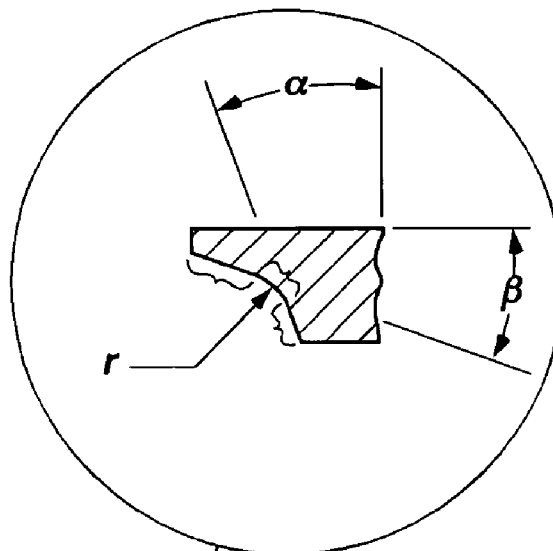
FIG. 9-B
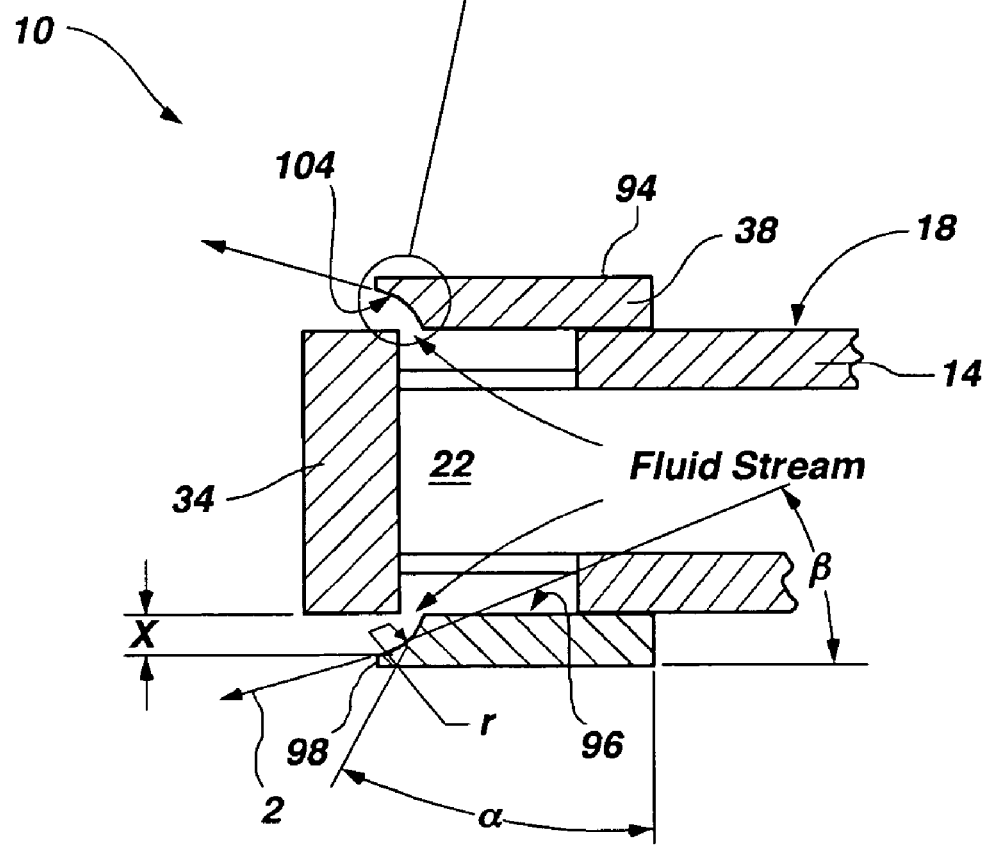
FIG. 9-A

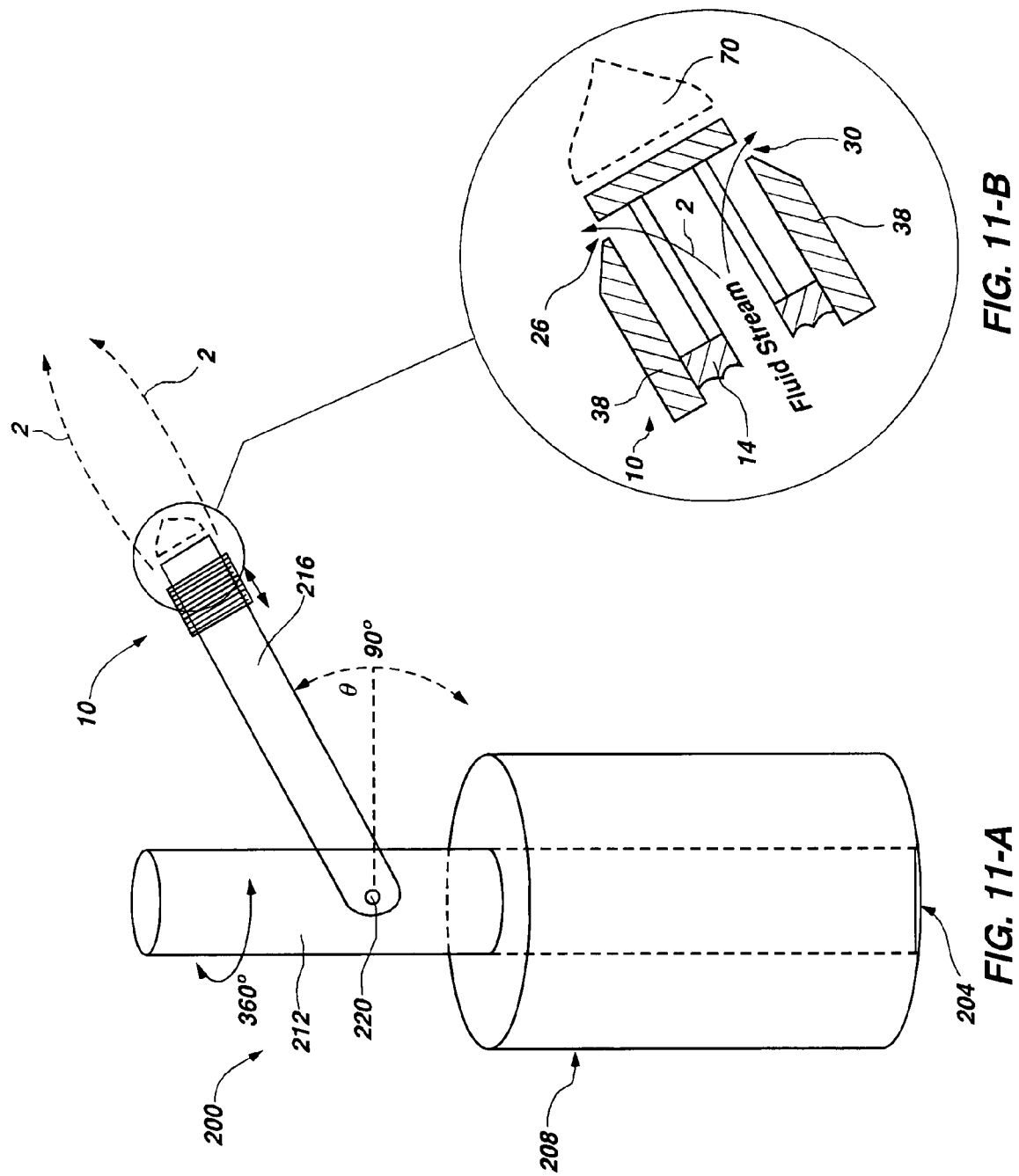
FIG. 11-A
FIG. 11-B

FLOW FORCE COMPENSATED SLEEVE VALVE

This application claims priority to U.S. Provisional Application Ser. No. 60/633,249, filed Dec. 2, 2004 in the United States Patent and Trademark Office, and entitled, "Flow Force Compensated Sleeve Valve," which application is incorporated by reference in its entirety herein.

FIELD OF THE INVENTION

The present invention relates to valves for specifically controlling the emission or flow of fluid. More particularly, the present invention relates to a sleeve valve or a slide valve configured to produce highly controlled fluid flow and to relieve the effect of fluid pressures existing within the sleeve on the forces required to actuate the sleeve.

BACKGROUND OF THE INVENTION AND RELATED ART

Slide valves or sleeve valves are widely known in the art and are used in many different applications to control the fluid flow within a particular environment. Although a variety of sleeve valve designs exist, each comprises a common component or element that exists in one form or another, namely a type of sliding or rotating or otherwise movable sleeve that opens and closes, or otherwise regulates, a fluid passageway.

Sleeve valves are particularly known to operate within extreme environments, such as high temperature and high pressure environments, although many sleeve valves or sleeve valve designs have been found to be beneficial in less extreme environments as well. In any event, as a fluid is forced to flow within a conduit-type structure (e.g., a pipe, hose, etc.) it is accompanied by a corresponding or associated fluid pressure. This fluid pressure must be properly contained and sufficiently regulated in order to maintain the integrity of the system in which it is present and in which the fluid is flowing. Therefore, any valves present within the system must also be capable of receiving and supporting the fluid and its associated fluid pressure. As a product of their efficient design and relatively simple operating mechanisms, sleeve valves are widely used to control the flow of fluid within pressurized environments. As a drawback to being used in such pressurized environments, however, the fluid pressures existing within the sleeve valve are capable of exerting significant forces on the movable sleeve, particularly if the movable sleeve is supported by one or more seats. If seated, the movable sleeve experiences additional forces acting upon it from the structural elements of the seats. These forces are created by the high pressures existing within the valve that cause the movable sleeve and the supporting seats to compress against one another. Thus, sleeve valves often comprise a movable sleeve that is not easily actuated and that is adversely affected by the fluid pressures existing within the sleeve valve. To overcome these pressures, many sleeve valves are operably connected to some type of powering means used to actuate the movable sleeve. For instance, high power mechanical, electromechanical, and other similar power-assist devices and systems are often employed, wherein the presence of these devices or systems is more than one of convenience merely to eliminate the need to manually operate the valve. Indeed, a primary purpose of these power assist devices and systems is to overcome the often significant fluid pressures and resultant inertial structural forces acting upon the movable sleeve. Overcoming these inertial forces enables the movable sleeve to be actuated and the sleeve valve opened and closed as needed.

Other sleeve valves may or may not be manually actuated. Similarly, because of the fluid forces accompanying any type of forced fluid flow, manually operated sleeve valves are limited in their applications in that only low pressure fluid flows may be accepted or received therein. A high pressure fluid flow would either bind the movable sleeve so that it cannot move, or significantly hinder its ability to move as a result of the forces acting upon the movable sleeve contributing to its resistance to any displacement or actuation.

Fluid control is important in closed-loop and other similar applications. In these applications, it is common to employ a servovalve to provide the means for controlling the fluid. A servovalve is a device used to provide fluid control typically in a continuously acting, bi-directional closed-loop system. A servovalve provides servocontrol, which is control actuated by a feedback system. In short, an output signal is compared to an input or reference signal, wherein corrections are made by the servovalve to correct any differences between the two. The feedback signal may be provided by fluid pressure, mechanical linkage, electrical signal, or a combination of these.

One particular application in which servovalves are common is in hydraulic systems. Many control systems employ hydraulic elements for control of a larger object system. The power supply in such object systems is normally in the form of a pump, but the application of power is controlled by a servovalve. The servovalve controls the rate, including direction, of hydraulic fluid flow and effectively functions as the interface between the hydraulic elements and the control elements.

SUMMARY OF THE INVENTION

In light of the problems and deficiencies inherent in the prior art, the present invention seeks to overcome these by providing an improved fluid flow control device. Specifically, the present invention seeks to provide high performance proportional and/or digital control of a fluid flow by featuring a flow force compensated sleeve valve (hereinafter "sleeve valve") that is operable within a high pressure environment, wherein the forces required to actuate or displace the movable sleeve of the sleeve valve are substantially unaffected by the fluid pressures generated and acting within the sleeve valve and the high pressure environment. It is preferred that the sleeve valve be manufactured with minimal valve actuating force requirements, size, and complexity. Of course, the sleeve valve may also be operable in low pressure environments.

Accordingly, it is an object of some of the exemplary embodiments of the present invention to provide a sleeve valve that overcomes the deficiencies in the related art discussed above.

It is another object of some of the exemplary embodiments of the present invention to provide a sleeve valve where the forces required to actuate or displace the movable sleeve are substantially unaffected by the fluid pressures acting within the valve body.

It is still another object of some of the exemplary embodiments of the present invention to provide a sleeve valve that delivers a highly efficient fluid emission, and particularly, one that can be used to control a liquid stream or jet exhausted to the atmosphere in such a manner that virtually no liquid flow force acts on the moving valve member.

It is a further object of some of the exemplary embodiments of the present invention to provide a sleeve valve that may be incorporated into various systems to deliver highly precise and targeted fluid emissions.

It is still a further object of some of the exemplary embodiments of the present invention to provide a sleeve valve that may be manually operated, even in a high pressure environment.

It is still a further object of some of the exemplary embodiments of the present invention to provide a sleeve valve where fluid pressures within the valve do not act upon the movable sleeve to open, close, or otherwise displace the movable sleeve.

It is still a further object of some of the exemplary embodiments of the present invention to provide a sleeve valve that, when controlling a homogenous fluid flow, various flow force compensation schemes may be implemented to reduce flow forces acting on the moving valve member.

It is still a further object of some of the exemplary embodiments of the present invention to provide a sleeve valve that has minimal manufacturing complexity as compared to conventional valves.

It is still a further object of some of the exemplary embodiments of the present invention to utilize the flow force compensated sleeve valve in a modular manner suitable for use as a modular resistive fluid flow element to form high performance, multi-port servovalves.

Although several objects of some of the various exemplary embodiments have been specifically recited herein, these should not be construed as limiting the scope of the present invention in any way. Indeed, it is contemplated that each of the various exemplary embodiments comprises other objects that are not specifically recited herein. These other objects will be apparent to and appreciated by one of ordinary skill in the art upon practicing the invention as taught and described herein.

To achieve the foregoing objects, and others not specifically recited, and in accordance with the invention as embodied and broadly described herein, the present invention features a sleeve valve comprising an elongate body having an outer surface and including a lumen for receiving a fluid and an associated fluid pressure therein and for defining a flow path of the fluid; at least one fluid flow port formed through the outer surface that is in fluid connection with the lumen; and a sleeve slidably disposed about the outer surface of the body and configured to displace across the fluid flow port to precisely regulate fluid emission through the fluid flow port. The sleeve and elongate body are operably related in a manner so as to provide some degree of fluid force compensation, such that the forces necessary to displace the sleeve across the fluid flow port are substantially unaffected by the fluid pressures acting within the body and at the fluid flow port. In other words, the fluid pressures do not substantially contribute to the inertial resistance of the sleeve to movement during actuation.

In one aspect or exemplary embodiment of the present invention, the elongate body is a stationary or fixed body, thus providing a dynamic sleeve. The elongate body typically comprises two opposing and complementary fluid flow ports for emitting fluid from the lumen, but a single fluid flow port is also contemplated, as well as a plurality of fluid flow ports depending upon the particular needs or requirements of the intended application. The elongate body may be a prismatic body, or it may comprise an irregular shape or a shape having a varying (e.g., tapered) cross-section. The elongate body further comprises one or more means for connecting to a fluid supply and/or fluid return. In addition, the elongate body comprises means for connecting a directional valve or other similar structure to the elongate body for directing the fluid and controlling its flow in a desired manner once it exits the fluid flow port.

The sleeve typically will comprise a similar shape as that of the elongate body, congruent with the outer surface of the elongate body, so as to fit over and slide or rotate about the body, and particularly the fluid flow port, in a mating or matching relationship. In one aspect, the sleeve is coaxially disposed about the body. In another aspect, the sleeve valve comprises a non-seated design, meaning that the movable sleeve is not supported by one or more seats. Thus, there are no associated seat structure forces to overcome upon displacement or actuation of the movable sleeve. The sleeve valve may comprise a single sleeve to regulate the fluid emissions from a single or a plurality of fluid flow ports. The sleeve valve may also comprise multiple sleeves that may be disposed about the elongate body over various respective fluid flow ports. In each of these exemplary embodiments, the sleeve displaces about the elongate body and across or about the one or more fluid flow ports substantially unaffected by the fluid pressures and associated forces at the fluid flow ports.

In a another exemplary embodiment, the present invention features a sleeve valve comprising a fluid inlet; a thin wall enclosure extending from the fluid inlet and forming an elongated prismatic body having a lumen for receiving a fluid and an associated fluid pressure therein; at least two opposing and complementary fluid flow ports formed through an outer surface of the prismatic body for uniformly emitting fluid from the lumen of the prismatic body; a sleeve disposed about the prismatic body and configured to slide about the outer surface and across the fluid flow ports, wherein the fluid flow ports cause the fluid pressure to be equally applied to opposing and complementary areas of the sleeve allowing the sleeve to maintain a continuous coaxial relationship with the prismatic body, such that forces necessary to displace the sleeve across the fluid flow port are substantially unaffected by the fluid pressure at the fluid flow ports.

The present invention further features a sleeve valve comprising an elongate body having an outer surface and including a lumen for receiving a fluid and an associated fluid pressure therein and for defining a fluid flow path; at least one fluid flow port formed within the elongate body, wherein the fluid flow port is in fluid connection with the lumen; and a sleeve slidably disposed about the outer surface and configured to displace across the fluid flow port to precisely regulate fluid emission through the fluid flow port.

The present invention still further features a method for regulating fluid flow comprising providing a fluid source configured to deliver a fluid under pressure; connecting the fluid source to an inlet on a sleeve valve, wherein the sleeve valve comprises the elements discussed above; pumping the fluid through the sleeve valve; directing a portion of the fluid against the sleeve to generate a counter force; and actuating the sleeve to selectively emit fluid from the fluid flow port in a highly precise and efficient manner.

As indicated, the present invention sleeve valve may be utilized within various systems to improve the fluid output of these systems. For instance, the present invention further features a sprinkler head comprising a housing having an inlet for receiving fluid from a fluid source; a sleeve valve supported by the housing; and means for actuating the sleeve to emit fluid from the fluid flow port and to precisely and selectively deliver the fluid to a pre-determined location. In this exemplary embodiment, the sleeve valve comprises an elongate body having an outer surface and including a lumen for receiving a fluid and an associated fluid pressure therein and for defining a flow path of the fluid; at least one fluid flow port formed within the outer surface and in fluid connection with the lumen; and a sleeve slidably disposed about the outer surface and configured to displace across the fluid flow port to precisely regulate fluid emission through the fluid flow port, the sleeve and elongate body being operably related, such that forces necessary to displace the sleeve across the fluid flow port are substantially unaffected by the fluid pressure at the fluid flow ports.

Another exemplary system in which the present invention sleeve valve may be utilized is within a decorative water delivery system. As such, the present invention further features a unique decorative water delivery system comprising at least one inlet for receiving fluid from a fluid source; at least one sleeve valve in fluid connection with the inlet; means for actuating the sleeve; and means for generating an artistic fluid emission. The sleeve valve comprises elements of any of the embodiments discussed above, thus allowing the fluid to be delivered in a highly precise and efficient manner.

Still another exemplary application for the present invention sleeve valve design is in closed-loop and other similar systems utilizing a servovalve or other similar valve structure. As such, the present invention features a high performance, multi-port servovalve comprising a first flow force compensation arrangement; and at least one other flow force compensation arrangement operably coupled to the first flow force compensation arrangement in a modular manner so as to create or provide a servovalve. The servovalve may comprise a two, three, or four-way servovalve and will typically operate within a hydraulically or pneumatically controlled environment.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 3-A illustrates a partial cut-away view of a flow force compensated sleeve valve with the sleeve in a partially opened position about the fluid flow port;

FIG. 3-B illustrates a partial cut-away view of a flow force compensated sleeve valve with the sleeve in a fully opened position about the fluid flow port;

FIG. 3-C illustrates a partial cut-away view of a flow force compensated sleeve valve with the sleeve in a closed position about the fluid flow port;

FIG. 9-A illustrates a partial cut-away view of another exemplary embodiment of a flow force compensated sleeve valve;

FIG. 9-B illustrates a detailed view of the deflector of the sleeve valve of FIG. 9-A, according to one exemplary embodiment;

FIG. 11-A illustrates a perspective view of an exemplary sprinkler head utilizing a flow force compensated sleeve valve; and FIG. 11-B illustrates a detailed view of an exemplary sleeve valve component as utilized with the sprinkler head of FIG. 11-A.

DETAILED DESCRIPTION AND EXEMPLARY EMBODIMENTS

Figure 1:
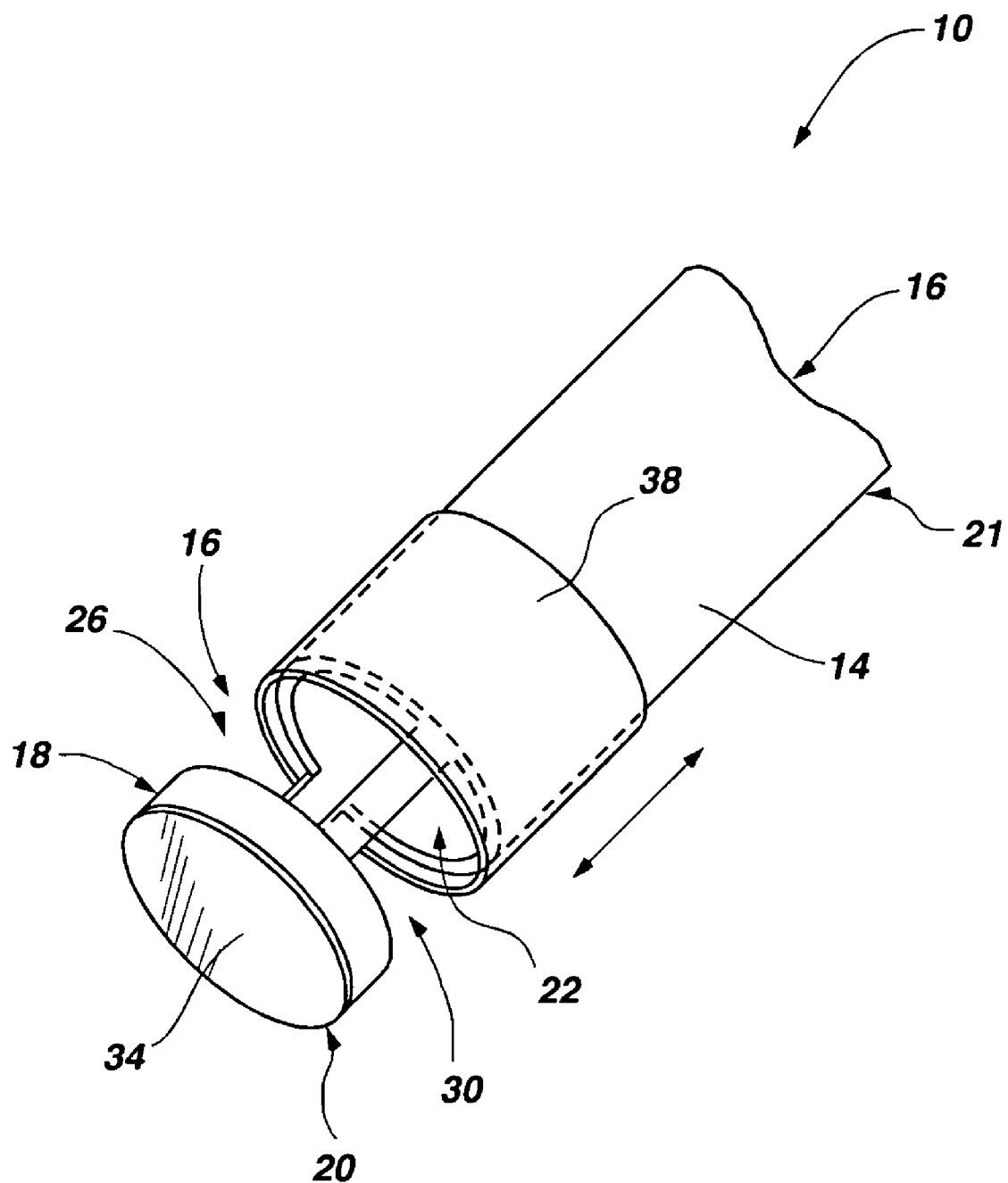
FIG. 1 illustrates an isometric view of the flow force compensated sleeve valve according to one exemplary embodiment.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 11-B, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Preliminarily, the phrase/term "prismatic body," as used herein, as well as similar phraseology, shall be understood to mean any shaped elongate body having uniform symmetry along any cross-section.

The phrase/term "flow force compensation," as used herein, as well as similar phraseology, shall be understood to mean the design technique used to shape fluid flow passage through a variable sized fluid flow port so as to reduce steady-state flow forces.

The present invention features a flow force compensated sleeve valve capable of delivering high performance proportional and/or digital control of a fluid flow through the valve. This fluid flow may be unidirectional to achieve unidirectional flow force compensation, or bi-directional to achieve bi-directional flow force compensation depending upon one or more factors discussed below. In practice, the flow force compensated sleeve valve regulates the emission of fluid from the valve by providing a movable sleeve that displaces across one or more fluid flow ports formed in the body of the valve and that are in fluid connection with a lumen and associated fluid stream. Pressurized fluid may be fed laterally into or centrally out of the lumen through the adjustable or variable fluid flow ports depending upon the direction of the fluid pressure gradient. Because of the particular structural configuration of and relationships between the elements of the valve, the forces required to actuate or displace the movable sleeve are substantially unaffected by the fluid pressures generated and acting within the valve. As fluid flows through the one or more fluid flow ports, the cross-sectional area of the ports is smaller than the cross-sectional area of the lumen, thus creating a region of high velocity and low pressure near the fluid flow ports compared to that within the lumen. This region of high velocity and low pressure (or flow force) acting on the movable sleeve near the high velocity flow tends to close the sleeve. However, this flow force and its tendency to close the sleeve is reduced or substantially eliminated as a result of the one or more flow force compensation designs and associated methods of the present invention sleeve valve.

The flow force compensated sleeve valve is suitable for use within a variety of environments and for a variety of applications. For instance, in one aspect the flow force compensated sleeve valve may be utilized to control fluid flow in any system or device that exhausts liquid jets to the atmosphere. Some of these devices and/or systems include, but are not limited to, water fountains, entertainment or artistic water delivery systems, sprinkler heads, and others. In another aspect, the fluid flow force compensated sleeve valve may be utilized in any system or device requiring fluid flow control of homogenous fluids, such as power hydraulic systems. In still another aspect, the flow force compensated sleeve valve may exist as a modular structure or element forming two, three, or four-way, high bandwidth, high flow, hydraulic or pneumatic servovalves allowing independent control of flow restrictive elements. Other applications and/or environments will be obvious to one skilled in the art.

The present invention flow force compensated sleeve valve provides many significant advantages over prior related sleeve valves. First, the present invention sleeve valve implements flow force compensation to minimize valve actuating force requirements. This allows the valve to operate in high pressure environments without affecting the ability to actuate or displace the sleeve. Second, the present invention sleeve valve exhibits structural and performance characteristics suitable for either analog valve applications or high speed digital valve applications. Third, the present invention sleeve valve design may be used in a modular manner to form high performance multi-port, servovalves having independent control of individual restrictive elements. Fourth, the present invention sleeve valve is easily adaptable for use within existing systems or devices. Fifth, the present invention sleeve valve provides precise delivery or emission of a fluid in a clean, laminar state, or in a pulsing or segmented (chopped/fractionated) stream manner. The bolus of fluid may be delivered in a periodic, recurring manner, or arbitrarily, or both. Due to its design, the present invention sleeve valve is capable of emitting a highly accurate bolus of fluid or a highly accurate non-fractionated stream or jet of fluid, particularly in those applications where fluid is exhausted to the atmosphere. Sixth, the present invention sleeve valve is capable of performing as a high performance, multi-port servovalve. Other advantages not specifically recited herein will be apparent to one skilled in the art, and therefore, those that are recited should not be construed as limiting in any way.

Figure 2:
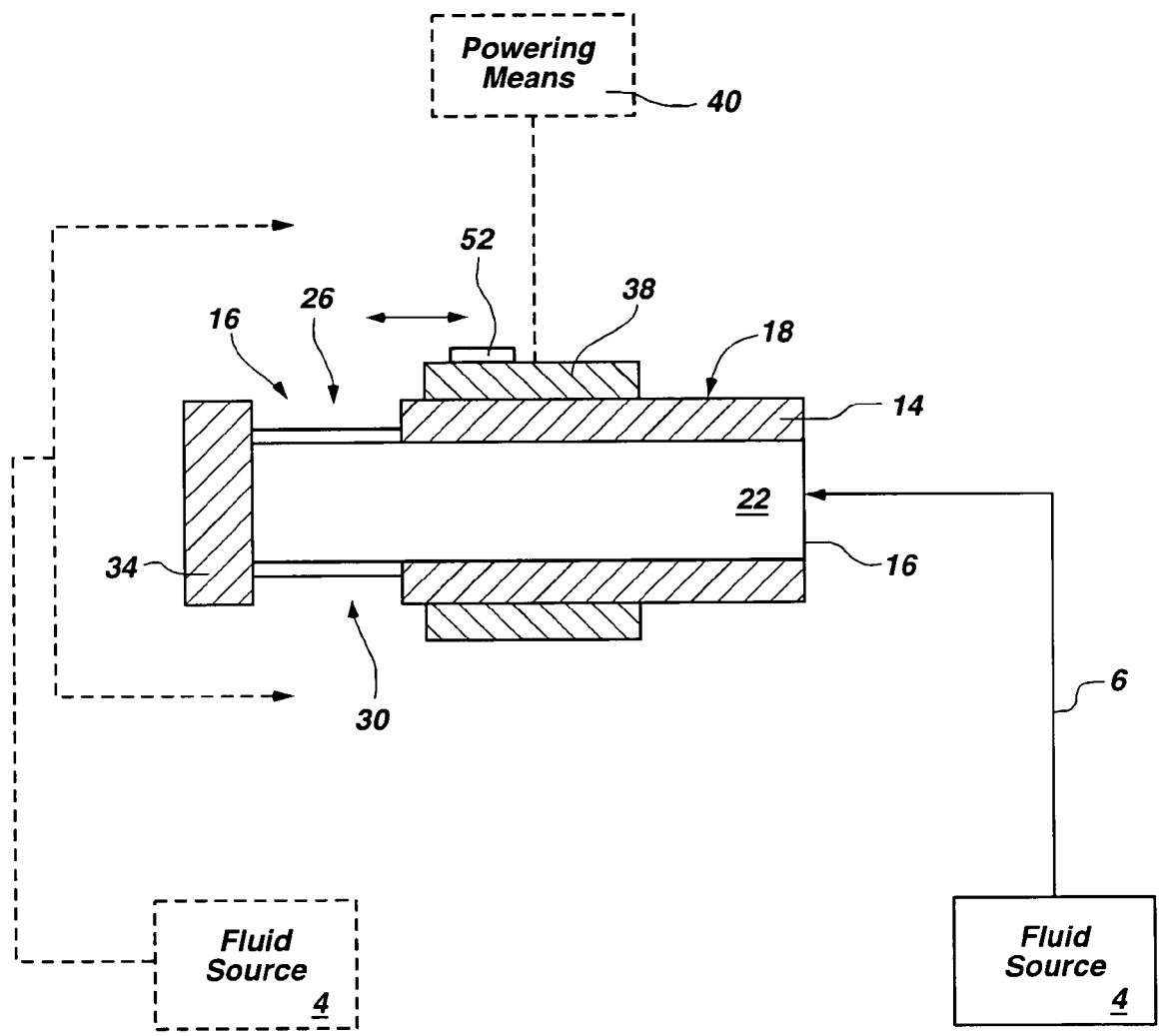
FIG. 2 illustrates a cut-away view of the flow force compensated sleeve valve of FIG. 1.

With reference to FIGS. 1 and 2, shown is an isometric view and a cut-away side view, respectively, of one exemplary embodiment of a flow force compensated sleeve valve 10. As shown, sleeve valve 10 comprises an elongate body 14 in the form of a cylinder having a uniform cross-section from first end 20 to second end 21. Elongate body 14 may comprise other designs. In one aspect, elongate body 14 may consist of any type of prismatic body. In another aspect, elongate body 14 may consist of a body having a varying or a non-uniform cross-section. These will be obvious and apparent to one skilled in the art. Elongate body 14 further comprises an outer surface 18 and is configured to create a fluid channel or lumen 22 along its longitudinal axis. Lumen 22 functions to direct the fluid flowing therein so that it contacts one or more fluid flow ports. In the embodiment shown, lumen 22 has at one end and is bound by a fixed core 34. Elongate body 14 is also configured with at least one fluid inlet 16 that is fluidly coupled to a fluid source 4 via a delivery means 6. Fluid delivery means may comprise any conduit-like structure, such as a pipe or hose, that is capable of facilitating the transfer of fluid from the fluid source to inlet 16 and through lumen 22 of sleeve valve 10.

Sleeve valve 10 further comprises one or more openings or fluid flow ports formed in outer surface 18 of elongate body 14 that function as the means that allow fluid to flow into and out of lumen 22. As such, these fluid flow ports are designed to be in fluid connection with lumen 22. FIGS. 1 and 2 illustrate sleeve valve 10 as comprising two lateral complementary fluid flow ports formed in outer surface 18 of elongate body 14, namely fluid flow ports 26 and 30. The orientation and complementary nature of these fluid flow ports enable an equalization of pressure acting upon the sleeve disposed about elongate body 14. Each of fluid flow ports 26 and 30 consist of a lateral design or are laterally formed, such that pressurized fluid may pass through them in a lateral manner with respect the orientation of sleeve valve 10.

As pressurized fluid may be fed laterally into or centrally out of lumen 22 through fluid flow ports 26 and 30, it follows that fluid flow ports 26 and 30 are configured to provide either unidirectional or bi-directional fluid flow, or both, depending upon the particular direction of the fluid pressure gradient, which gradient direction depends upon the particular application in which sleeve valve 10 is being used. Specifically, in one aspect, fluid flow ports 26 and 30 function to emit a fluid flowing through lumen 22 and towards fluid flow ports 26 and 30 in an outward manner or out of sleeve valve 10, such that fluid is emitted into the surrounding atmosphere (in an open atmosphere application). In another aspect, fluid flow ports 26 and 30 function to receive fluid from the surrounding atmosphere into lumen 22 (e.g., in a closed-loop application).

Fluid flow ports 26 and 30 are shown comprising an opposing laterally slotted configuration, wherein fluid flow port 26 is formed opposite that of and is complementary to fluid flow port 30. Providing opposing fluid flow ports of corresponding size and shape allows fluid to enter or exit lumen 22 in an equalized state. Stated differently, the fluid flowing into or out of fluid flow ports 26 and 30 is typically under significant pressure. Allowing fluid to enter or exit sleeve valve 10 through fluid flow ports 26 and 30 effectively equalizes the fluid flow pressured acting within or on the valve so that the likelihood of a pressure differential is reduced or eliminated. Of course, it is contemplated that sleeve valve 10 may comprise other embodiments that utilize a single fluid flow port. A single fluid flow port may be desirable for one or more purposes as will be recognized by one skilled in the art.

As indicated, fluid flow ports 26 and 30 comprise a slotted configuration laterally formed through outer surface 18 and elongate body 14, which when viewed in cross-section comprises a rectangle or square. However, other designs may be utilized to create a fluid flow port in fluid connection with lumen 22 for the purpose of controlling fluid flow. Indeed, the fluid flow port may comprise any polygonal geometry in its cross-section. Other designs may comprise a circle or oval shape. In any event, the cross-sectional area of fluid flow ports 26 and 30 is designed and configured to be smaller than the cross-sectional area of lumen 22. The significance of designing and providing a fluid flow port having a smaller cross-sectional area than lumen 22 is to create a region of high velocity and low pressure at the fluid flow port interface. As such, most, if not all, of the embodiments of sleeve valve 10 will comprise one or more fluid flow ports having a smaller cross-sectional area than the lumen to which they are fluidly connected. Moreover, fluid flow ports 26 and 30 are variable flow ports, meaning that their cross-sectional area may be manipulated or changed. This is accomplished by providing a sleeve 38 that displaces across fluid flow ports 26 and 30 in a selective manner to control the available area through which fluid may pass.

In still another aspect, it is contemplated that a fluid flow port may be designed and formed through outer surface 18 and elongate body 14 in a manner other than lateral. In other words, one or more fluid flow ports may be formed on an angle with respect to outer surface 18 of sleeve valve 10. For instance, referring back to FIG. 1, fluid flow ports 26 and 30, instead of being formed or oriented in a lateral or perpendicular manner with respect to outer surface 18, they may be oriented at an angle with respect to outer surface 18. One skilled in the art will recognize that the one or more fluid flow ports formed within elongate body 14 may comprise this and other design configurations. As such, those specifically recited herein and illustrated in the figures are not meant to be limiting in any way, and should not be construed as limiting.

Fluid flow ports 26 and 30 may be positioned anywhere along outer surface 18. As shown in FIGS. 1 and 2, fluid flow ports 26 and 30 are positioned substantially proximate fixed core 34 at first end 20, which is distal from or opposite end 21.

Sleeve valve 10 is shown further comprising a fixed core 34 positioned at first end 20. Fixed core 34 is essentially an end cap that functions as a stopper to restrict or contain the flow of fluid within lumen 22 and to ensure the fluid flows through the one or more fluid flow ports formed within sleeve valve 10 rather than continuously through lumen 22.

Sleeve valve 10 further comprises a movable sleeve 38 that is slidably disposed about outer surface 18. Sleeve 38 functions to regulate or control the flow of fluid through fluid flow ports 26 and 30 by displacing along outer surface 18 and across fluid flow ports 26 and 30 for the purpose of varying the available cross-sectional area of fluid flow ports 26 and 30. By displacing across fluid flow ports 26 and 30, sleeve 38 is able to precisely regulate or control fluid emission through the fluid flow ports by opening, closing, or partially opening sleeve valve 10, and particularly fluid flow ports 26 and 30. Typically, sleeve 38 is configured to slidably displace back and forth or oscillate about outer surface 18 in a bi-directional manner. However, sleeve 38 may be designed to rotate about a pivot point to open and close fluid flow ports 26 and 30 rather than to displace bi-directionally. Fluid discharge from sleeve valve 10, due to the relationship between its component parts as described herein, is significantly more laminar and precise than prior related valves. In addition, because of the displacement capabilities of sleeve 38, fluid may be discharged in a continuous stream or jet, or it may be discharged in a bolus, wherein the jet is fractionated or chopped. In addition, the bolus of fluid may be delivered in a recurring pulsing manner.

Sleeve 38 requires at least some force to cause it to displace. This force is referred to herein as the actuation force of the sleeve valve. A significant advantage over prior related sleeve valves is that the present invention sleeve valve requires only minimal actuation forces to properly displace sleeve 38. Due to the design of sleeve valve 10, sleeve 38 is operably related to elongate body 14 and fluid flow ports 26 and 30 such that the actuation forces necessary to overcome inertial resistance and displace sleeve 38 across fluid flow ports 26 and 30 are substantially unaffected by the fluid pressures and any resulting forces acting within or about sleeve valve 10, and particularly those acting at the interface between lumen 22 fluid flow ports 26 and 30. Thus, even in high pressure environments where the fluid pressures within or about sleeve valve 10 are significant, these pressures and any resulting forces still will have little or no affect on the actuation forces needed to displace sleeve 38.

The region of high velocity and low pressure discussed above that is created at the interface of fluid flow ports 26 and 30 (due to the fact that the fluid flow ports comprise a smaller cross-sectional area than their lumen counterpart) functions to induce an associated flow force that acts upon sleeve 38. In particular, this fluid flow force acts upon the portion of sleeve 38 that is near the high velocity fluid flow. The result of this fluid flow force is the tendency to displace sleeve 38 towards a closed position, thus closing sleeve valve 10. The advantage of the present invention is the ability to compensate for this tendency. Stated differently, this fluid flow force can be significantly reduced and even virtually eliminated in some instances by employing one or more methods of flow force compensation dictated by the particular design of sleeve valve 10 and its component parts or elements. These various force compensation methods are employed to achieve a primary advantage of the present invention, namely that the forces required to actuate sleeve 38 are unaffected or substantially unaffected by the fluid forces acting within or about sleeve valve 10. Several flow force compensation schemes are provided and discussed below.

FIGS. 1 and 2 illustrate sleeve valve 10 having a single sleeve 38 that is concentrically disposed about elongate body 14 to displace across two fluid flow ports, namely fluid flow ports 26 and 30. However, elongate body 14 may comprise any number of fluid flow ports regulated by a single sleeve. In addition, sleeve valve 10 may comprise any number of sleeves depending upon different design considerations and constraints. In one aspect, sleeve valve 10 may comprise a plurality of sleeves disposed about elongate body 14, each of which are configured to displace across one or more respective fluid flow ports formed in or through outer surface 18.

Typically, sleeve 38 comprises an inner and outer surface, wherein the inner surface mates with outer surface 18 of elongate body. Indeed, in most embodiments sleeve 38 typically comprises a superposable member with an inner surface similar to outer surface 18 of sleeve valve 10, such that sleeve 38 forms a congruent relationship with outer surface 18 throughout. This congruent relationship facilitates a smooth unencumbered displacement motion for sleeve 38. The term "congruent" shall be understood to mean coincident, substantially coincident, or of the same or similar surface shape so as to provide a mating or matable relationship.

Furthermore, sleeve valve 10 may comprise a biasing element configured to return sleeve 38 to a resting, secured position. The biasing element will typically be in the form of a spring of one or more types.

Sleeve valve 10 may be utilized in several different environments. In one aspect, sleeve valve 10 may be configured to emit fluid to the surrounding atmosphere in an open environment application. This is illustrated in FIG. 2 by fluid source 4 delivering a fluid to a fluid inlet 16 (not shown) at second end 21 of sleeve valve 10 via delivery means 6. One example of an open environment application is the incorporation of sleeve valve 10 into a sprinkler head (see FIGS. 11-A and 11-B), wherein the sprinkler head functions to irrigate a designated or identified area. In this application, fluid is transferred into the sprinkler head and emitted through sleeve valve 10 somehow supported by the structural configuration of the sprinkler head. Another example of an open environment arrangement is a decorative water fountain. In this arrangement, a plurality of sleeve valves may be strategically arranged and supported to provide fluid emissions in any imaginable artistic manner.

In another aspect, sleeve valve 10 may be utilized within a closed environment application, wherein sleeve valve 10 is placed in the closed environment and configured to transfer fluid or control the flow of fluid through the closed environment. This is illustrated in FIG. 2 by fluid source 4, shown in dotted lines, delivering a fluid to a fluid inlet 16 (otherwise fluid flow ports 26 and 30) at a first end 20 of sleeve valve 10 via delivery means 6. An example of a closed environment application comprises incorporating sleeve valve 10 into a closed-loop hydraulic or pneumatic system to function as a servovalve. In this application, sleeve valve 10 would control the flow of fluid in a similar manner as a spool valve in existing servovalves. However, because of its structural differences, it can be said that sleeve valve 10 is essentially the inverse of a spool valve, with added benefits and advantages. This particular closed environment application is more fully described below.

FIG. 2 further illustrates protrusion 52 extending upward from sleeve 38. Protrusion 52 is configured to facilitate manual actuation of the sleeve 38. Alternatively, sleeve 38 may be actuated by powering means 40 operably coupled to the sleeve valve 10. Powering means 40 may be implemented to automate the actuation of the sleeve valve and to eliminate any need for manual actuation. Powering means 40 may be any means known in the art configured for this purpose, and may be linked to a computer for further control.

Referring now to FIGS. 3-A, 3-B, and 3-C, shown is one exemplary sleeve valve 10 having sleeve 38 positioned in a partially open position (FIG. 3-A), a fully opened position (FIG. 3-B), and a closed position (FIG. 3-C). FIG. 3-A illustrates sleeve 38 in a partially open position as it displaces across elongate body 14. As can be seen, lumen 22 comprises a pressurized fluid 2 flowing in the direction toward fixed core 34. Fluid 2 has associated with it a fluid pressure that exerts an associated fluid force upon the inner walls of elongate body 14 defining lumen 22. At the interface of fluid flow ports 26 and 30, there is a region of high velocity and low pressure created, wherein the pressure induces an associated fluid flow force that has a tendency to close sleeve 38. The present fluid pressure and its associated fluid forces are illustrated by the arrows labeled fluid force 42. It should be noted that the term fluid force and fluid pressure are used interchangeably herein to mean the forces acting within sleeve valve 10, and particularly within lumen 22 and upon sleeve 38.

In the partially open position shown in FIG. 3-A, as fluid 2 enters sleeve valve 10 and as fluid 2 propagates towards fixed core 34 (such as in an open environment application), a portion of fluid 2 is emitted or exhausted to the surrounding environment through fluid flow ports 26 and 30 at a higher velocity than fluid flowing through lumen 22, particularly when the cross-sectional area of fluid flow ports 26 and 30 is reduced by displacement of sleeve 38. By selectively displacing and positioning sleeve 38 with respect to fluid flow ports 26 and 30, the flow characteristics of fluid 2, as it passes through fluid flow ports 26 and 30, are specifically and precisely controlled. In addition, sleeve 38 provides force compensation because the fluid jet being emitted is unable to make contact with the external surface of sleeve 38. Therefore, in the partially open position as fluid forces 42 are acting upon sleeve 38 as shown, the relationship between sleeve 38 and elongate body are such that the forces required to actuate or displace sleeve 38 are substantially unaffected by fluid forces 42. In other words, the valve can be used to control a liquid stream or jet exhausted to the atmosphere in such a manner that virtually no liquid flow force acts on the moving valve member. The liquid flow force is compensated as described and discussed herein.

FIG. 3-B illustrates sleeve 38 and sleeve valve 10 in a fully opened position with respect to fluid flow ports 26 and 30. In this position, there are no fluid forces acting upon sleeve 38. Thus, force compensation is not required and the force required to actuate sleeve 38 are totally unaffected by the fluid forces acting within lumen 22. However, upon actuation of sleeve 38 such that it displaces a distance to partially open sleeve valve 10, these fluid forces would come into play, as well as the principles of force compensation discussed herein for a partially open sleeve valve 10 (see FIG. 3-A and its corresponding discussion).

FIG. 3-C illustrates sleeve 38 and sleeve valve 10 in a fully closed position with respect to fluid flow ports 26 and 30. In this position, fluid flow ports 26 and 30 are closed, thus creating an extension of lumen 22, wherein the fluid pressures and associate fluid forces 42 acting upon sleeve 38 are the greatest. However, these forces are not sufficient to affect the forces required to actuate sleeve 38. The only forces that sleeve 38 must overcome are friction forces between its surfaces and outer surface 18 of elongate body 14.

Figure 4:
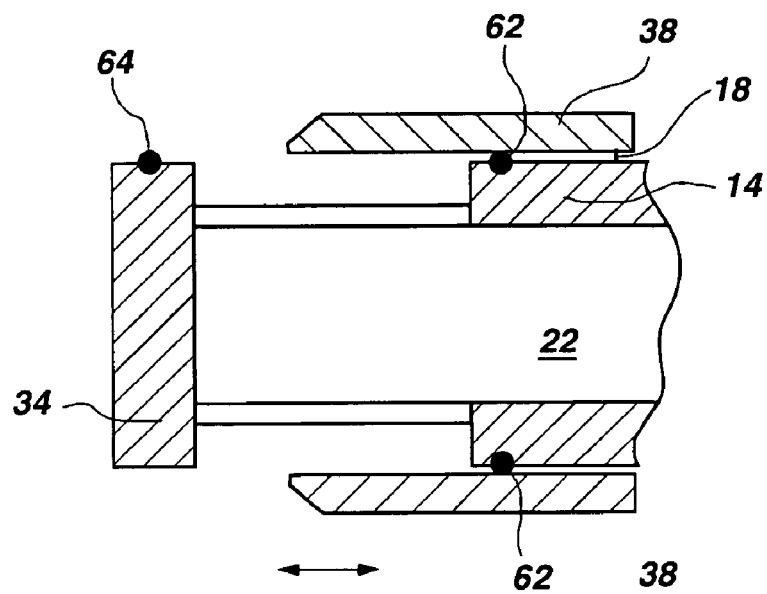
FIG. 4 illustrates a partial cut-away view of a flow force compensated sleeve valve comprising a seal positioned between the sleeve and the outer surface of the elongate body of the sleeve valve.

FIG. 4 illustrates an exemplary embodiment, wherein sleeve valve 10 further comprises a seal 62 positioned between outer surface 18 of elongate body 14 and sleeve 38. Depending upon the particular application or environment in which sleeve valve 10 is used, it may be desirable to seal sleeve 38 against outer surface 18 of elongate body 14 to prevent backflow of fluid or escape of fluid between sleeve 38 and elongate body 14. Seal 62 may comprise any type of seal commonly known in the art. As shown, seal 62 comprises a rubber or nylon seal seated in a groove formed partially within outer surface 18 and/or sleeve 38. Seal redundancy is also contemplated, wherein a plurality of seals are utilized as needed or desired, with their positioning being selectively determined. Still further, one or more seals 64 may be positioned between sleeve 38 and fixed core 34.

Figure 5:
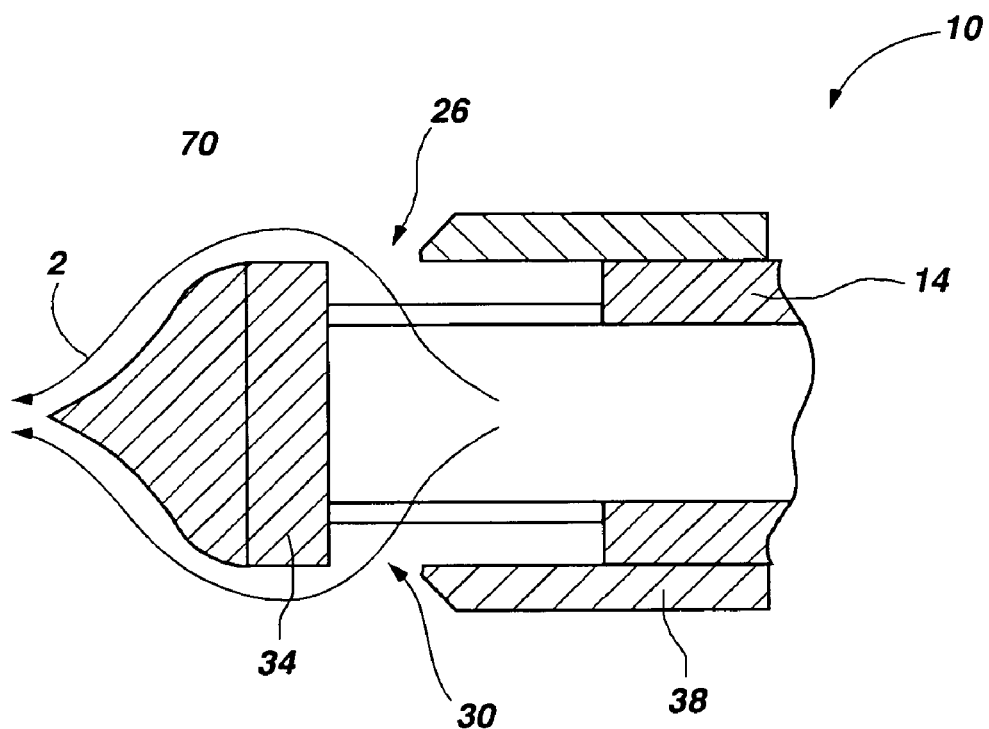
FIG. 5 illustrates a partial cut-away view of a flow force compensated sleeve valve having an exemplary nozzle structure coupled thereto.

FIG. 5 illustrates an exemplary embodiment of sleeve valve 10 comprising a nozzle 70 coupled to fixed core 34. Nozzle 70 functions to re-direct or further control fluid 2 as it is emitted from fluid flow ports 26 and 30. Specifically, as fluid 2 is exhausted from fluid flow ports 26 and 30, instead of discharging into the open or surrounding environment, fluid 2 reattaches to the surface of nozzle 70 where it follows the contour of nozzle 70. The reattachment of fluid 2 is based upon commonly understood principles of fluid dynamics. The affect of nozzle 70 on fluid 2 is that fluid 2 is re-directed as it leaves the surface of nozzle 70 in a manner dictated by the particular size and shape of the nozzle. The nozzle illustrated in FIG. 5 is only one example of many different types and designs of nozzles and should not be construed as limiting. As will be apparent to one skilled in the art, different nozzle-types may be utilized depending upon the particular fluid discharge desired.

Figure 6:
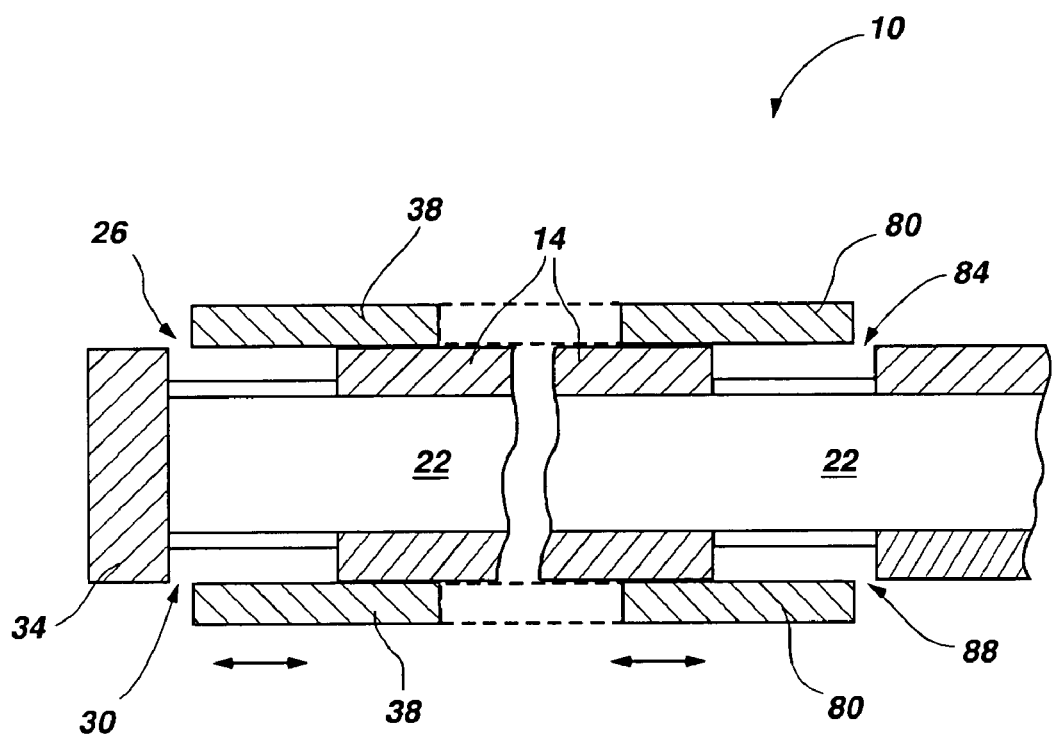
FIG. 6 illustrates a partial cut-away view of a flow force compensated sleeve valve having a plurality of fluid flow ports and a plurality of sleeves positioned to displace about the fluid flow ports, respectively.

FIG. 6 illustrates another exemplary embodiment, wherein sleeve valve 10 comprises a plurality of sleeves that displace across a plurality of respective fluid flow ports. Specifically, FIG. 6 illustrates sleeve valve 10 as comprising sleeve 38 that displaces across fluid flow ports 26 and 30, as well as sleeve 80 that displaces across fluid flow ports 84 and 88 in a similar manner. In this embodiment, fluid flow is further controlled such that fluid may pass in and out of sleeve valve 10 at various locations. Sleeves 38 and 80 are typically operated independently of one another so that fluid may be controlled to pass through one set of respective fluid flow ports or simultaneously through both of them. Still further both sets of fluid flow ports (or any designed plurality of fluid flow ports) may be controlled by a single sleeve, as illustrate by the dotted lines connecting sleeve 38 and sleeve 80 to represent a single sleeve.

Flow Force Compensation

The present invention comprises various force compensation properties that include the ability to compensate for the fluid flow forces generated and present as a result of the pressurized fluid and associated pressure gradients existing within or about the sleeve valve, wherein these force compensation properties are realized to significantly reduce and/or virtually eliminate the affect the fluid flow forces have on the displacement of the sleeve. As discussed above, when induced, these fluid flow forces adversely act upon the movable sleeves and create a tendency for the sleeve to displace towards a closed position, thus closing the sleeve valve. However, the present invention comprises several sleeve valve designs configured to compensate for these induced fluid flow forces that act upon the movable sleeve at the fluid flow port interface so that the forces require to actuate or displace the sleeve across the one or more fluid flow ports are substantially unaffected by the present fluid flow forces. Several of these sleeve valve designs and force compensation methods are presented and discussed below.

Figure 7:
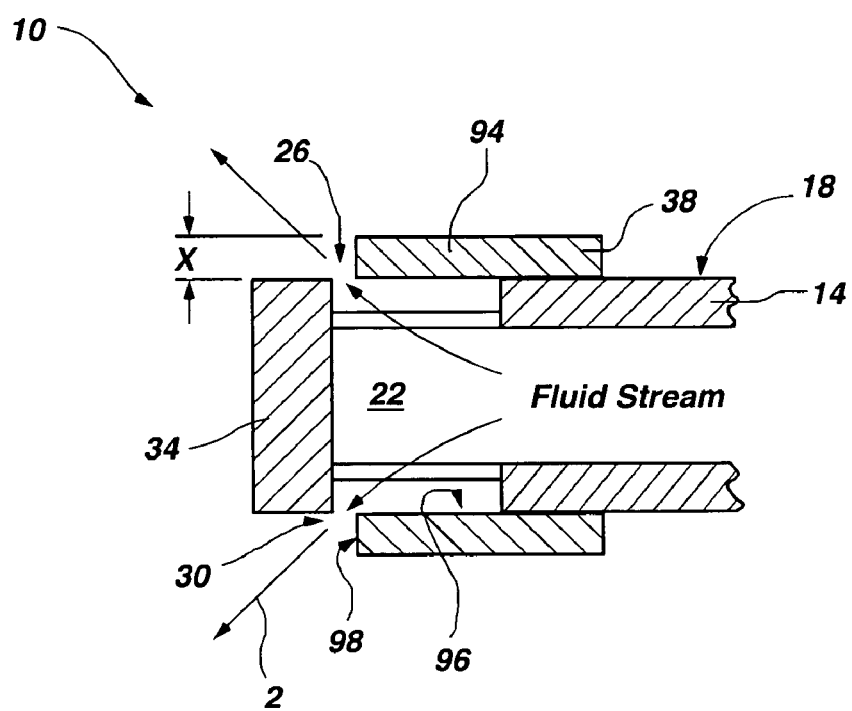
FIG. 7 illustrates a partial cut-away view of one exemplary embodiment of a flow force compensated sleeve valve.

With reference to FIG. 7, illustrates an exemplary embodiment of sleeve valve 10 designed to exhaust or emit a jet or stream of fluid to the surrounding atmosphere in an open environment application. In this embodiment, sleeve valve 10 comprises an elongate body 14 having a lumen 22 formed therein for receiving fluid. Lumen 22 is in fluid connection with fluid flow ports 26 and 30 that are each formed within outer surface 18 of elongate body 14. Sleeve valve further comprises a fixed core 34 that serves as a barrier for fluid flow within lumen 22.

Sleeve valve 10 further comprises a concentric movable sleeve 38 disposed about outer surface 18 that selectively displaces across fluid flow ports 26 and 30. As shown, sleeve 38 comprises a rectangular cross-section with an outer surface 94 and an inner surface 96 juxtaposed to outer surface 18 of elongate body 14 and a sidewall 98 oriented perpendicular to outer and inner surfaces 94 and 96. Sidewall 98 comprises a height, representative of a wall thickness of sleeve 38, identified as x. This height x may vary in response to the intended applications or system constraints or needs. Indeed, one skilled in the art will be able to determine the height necessary for a particular application. In this configuration, virtually complete flow force compensation is achieved when fluid 2 flows through lumen 22 and out of fluid flow ports 26 and 30 into the surrounding atmosphere. Virtually complete flow force compensation is achieved because the stream or jet of fluid being emitted is unable to make contact with the external sleeve surfaces, namely outer surface 94 and sidewall 98. Because little or no contact with the outer sleeve surfaces is made, the resulting induced fluid forces are unable to affect the forces necessary to actuate sleeve 38. It should be noted that the force compensation for this exemplary sleeve valve is effective only for the flow direction shown, namely flow out of sleeve valve 10.

Figure 8:
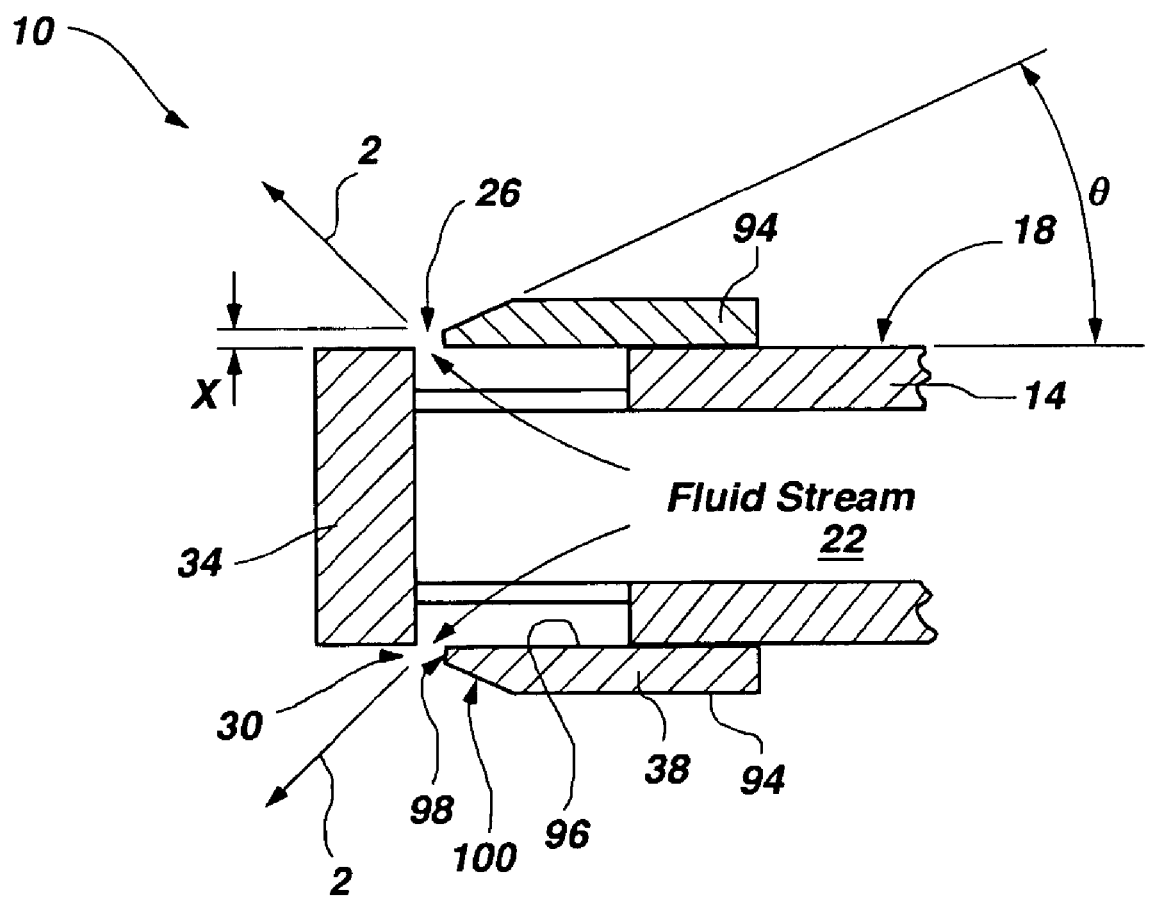
FIG. 8 illustrates a partial cut-away view of another exemplary embodiment of a flow force compensated sleeve valve.

FIG. 8 illustrates another exemplary embodiment of sleeve valve 10 designed to exhaust or emit a jet or stream of fluid to the surrounding atmosphere in an open environment application. In this embodiment, as in the one just discussed, sleeve valve 10 comprises an elongate body 14 having a lumen 22 formed therein for receiving fluid. Lumen 22 is in fluid connection with fluid flow ports 26 and 30 that are each formed within outer surface 18 of elongate body 14. Sleeve valve further comprises a fixed core 34 that serves as a barrier for fluid flow within lumen 22.

Similarly, sleeve valve 10 shown in FIG. 8 further comprises a concentric movable sleeve 38 disposed about outer surface 18 that selectively displaces across fluid flow ports 26 and 30. However, rather than comprising a rectangular cross-section, sleeve 38 comprises a cross-section with outer surface 94, inner surface 96, and sidewall 98 as shown, as well as a tapered segment 100 connecting outer surface 94 to sidewall 98, wherein said tapered segment is proximate and exposed to the fluid flowing from lumen 22.

Sidewall 98 comprises a height x that will be determinable based upon the intended application as discussed above. Tapered segment 100 comprises an angle $\theta$. This angle $\theta$ may range from 1° to 89° measured from the intersection of outer surface 94 and sidewall 98 of sleeve 38. In the embodiment shown, tapered segment 100 comprises an angle $\theta$ of about 30°.

In this embodiment, partial force compensation is achieved due to the tapered segment existing within sleeve 38. Force compensation is achieved because the surface area of sleeve 38 exposed to high velocity fluid flow is significantly reduced. In other words, the stream or jet of fluid being emitted is largely unable to make contact with the external sleeve surfaces, namely tapered segment 100, outer surface 94, and sidewall 98. Because little or no contact with the sleeve surfaces is made, the resulting induced fluid forces are unable to affect the forces necessary to actuate sleeve 38. Again, force compensation for this exemplary sleeve valve is effective only for the flow direction shown, namely flow out of sleeve valve 10.

With reference to FIGS. 9-A and 9-B, illustrated is another exemplary embodiment of sleeve valve 10 designed to exhaust or emit a jet or stream of fluid to the surrounding atmosphere in an open environment application. In this embodiment, as in the one just discussed, sleeve valve 10 comprises an elongate body 14 having a lumen 22 formed therein for receiving fluid. Lumen 22 is in fluid connection with fluid flow ports 26 and 30 that are each formed within outer surface 18 of elongate body 14. Sleeve valve further comprises a fixed core 34 that serves as a barrier for fluid flow within lumen 22.

Similarly, sleeve valve 10 shown in FIG. 9 further comprises a concentric movable sleeve 38 disposed about outer surface 18 that selectively displaces across fluid flow ports 26 and 30. In this embodiment, sleeve 38 includes a vane or deflector 104 configured to redirect fluid 2 in a desired direction, depending upon the particular configuration of deflector 104. Once exhausted through fluid flow ports 26 and 30 from lumen 22, fluid 2 contacts deflector 104 and is redirected along a pre-determined fluid flow path that corresponds to or is defined by the geometric shape and orientation of deflector 104.

Deflector 104 may comprise any configuration capable of redirecting fluid along a flow path. In the embodiment shown in FIG. 9, deflector 104 comprises three segments connected together to form deflector 104 between outer surface 94 and inner surface 96. The first of these three segments is a linear segment oriented at an angle β (typically between 0.1° and 45°) as measured from a sidewall 98. This segment transitions into a curved section having a radius r. The third section comprises another linear segment that is linked to curved segment r and that is oriented at an angle β (typically between 0.1° and 45°) as measured from outer surface 94. This three-segment configuration is only exemplary. Alternatively, deflector 104 may be comprised of an entirely curved segment. One skilled in the art will recognize that other deflector configurations may be utilized depending upon the direction fluid 2 is to be directed, as well as the compensation force desired.

Unlike the embodiments discussed above, emitted fluid has a substantial amount of contact with sleeve 38. Because of this contact, as fluid 2 is emitted and as fluid 2 contacts deflector 104, a counter force is induced that creates or imparts momentum to sleeve 38. This force and resulting momentum acts in opposition to the fluid flow force tending to close sleeve 38, as discussed above. As such, the force created from deflector 104 effectively compensates for and offsets the fluid flow force, thus negating all or part of the affects of the fluid flow force on sleeve 38 and the forces required to actuate or displace sleeve 38. The flow force compensation achieved by this embodiment is effective only in a unidirectional flow, namely for fluid flow out of lumen 22 and sleeve valve 10.

Figure 10:
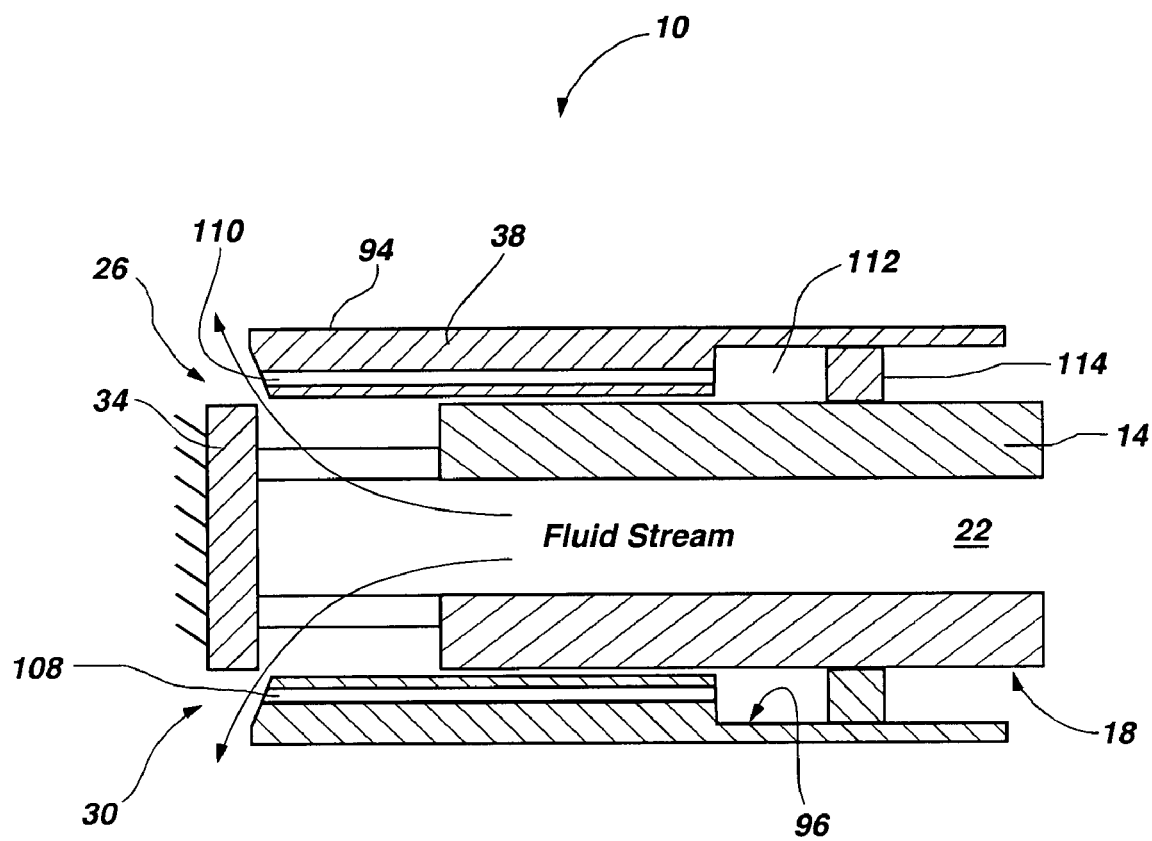
FIG. 10 illustrates a partial cut-away view of still another exemplary embodiment of a flow force compensated sleeve valve having a pressure feedback sensing port formed within the sleeve.

With reference to FIG. 10, shown is another exemplary embodiment of sleeve valve 10. In this embodiment, as in the ones just discussed, sleeve valve 10 comprises an elongate body 14 having a lumen 22 formed therein for receiving fluid. Lumen 22 is in fluid connection with fluid flow ports 26 and 30 that are each formed within outer surface 18 of elongate body 14. Sleeve valve further comprises a fixed core 34 that serves as a barrier for fluid flow within lumen 22.

Similarly, sleeve valve 10 shown in FIG. 10 further comprises a concentric movable sleeve 38 disposed about outer surface 18 that selectively displaces across fluid flow ports 26 and 30. One significant feature of this particular embodiment of sleeve valve 10 is its capability to provide limited bi-directional flow force compensation. Specifically, sleeve 38 is equipped with a pressure port (e.g., a Pitot pressure port) 108 formed within sleeve 38, wherein pressure port 108 is in fluid communication with the surrounding environment via opening 110 formed on the face of sleeve 38, such that the opening 110 is directly exposed to the fluid flow in contact with sleeve 38. Pressure port 108 extends a given distance through sleeve 38 and opens into a pressure chamber 112 bounded by stopper 114. As fluid 2 flows out of lumen 22, a portion of this fluid is caused to enter opening 110 and pressure port 108 because of its contact with sleeve 38 once emitted from fluid flow ports 26 and 30. As a result, pressure port 108 effectively provides some degree of force compensation to offset, at least in part, the fluid flow pressures acting against sleeve 38. Force compensation is regulated by a pressure feedback provided by pressure port 108 created as the portion of fluid 2 acts within pressure port 108 and pressure chamber 112. The degree of force compensation depends mostly upon the flow characteristics of fluid 2 as it flows from lumen 22 and as a portion of it enters pressure port 108. The degree of force compensation achieved also depends upon the size and configuration of pressure port 108. In any event, force compensation is achieved that functions to negate the fluid forces and particularly their affect on the forces required to actuate or displace sleeve 38.

In still other exemplary embodiments, the present invention flow force compensated sleeve valve design may be used in a modular manner to form high performance multi-port, servovalves having independent control of individual restrictive elements. In this design, the modular sleeve valve arrangement functions similar to a spool valve of prior related servovalves, only in an inverse manner.

FIG. 11-A illustrates a perspective view of an exemplary sprinkler head utilizing a flow force compensated sleeve valve. Specifically, FIG. 11-A illustrates sprinkler head 200 as comprising a fluid inlet 204 for receiving fluid from a fluid source and for properly directing the fluid into sprinkler head 200. In the embodiment shown, sprinkler head 200 comprises a rotatable housing 208 that contains and supports the various structural and other components (not shown) necessary to operate sprinkler head 200. From rotatable housing 208 rises extension 212 used to support arm 216. In the embodiment shown in FIG. 11-A, either rotatable housing 208 or extension 212 or both rotate back and forth about an axis within a possible 360° rotation.

Attached to extension 212 is arm 216 that rotates about a pivot point 220 positioned on extension 212 so as to allow arm 216 to travel about an arc between 0° and 180°. Rotation of housing 208 and/or extension 212 is typically about an axis that is perpendicular to or substantially perpendicular to the ground. Therefore, this rotation provides delivery of fluid within a horizontal plane extending out from sprinkler head 200 in any direction. Conversely, arm 216 rotates about pivot point 220. As such, rotation of arm 216 about this point allows fluid to be delivered in a vertical plane relative to the horizontal plane just described. Essentially, housing 208 and arm 216 function to provide two degrees of freedom to sprinkler head 200. Each of these structures operate in combination with one another to locate a fluid delivery point in any vector position, constrained only by the limitations of the structures themselves. Therefore, as housing 208 or extension 212 rotates within its 360° rotation, arm 216 is also allowed to pivot about pivot point 220. The combination of these two motions is what provides the vector positioning of the fluid delivery point of sprinkler head 200.

FIGS. 11-A and 11-B also illustrate sleeve valve 10 as coupled to or operably supported by arm 216. In the exemplary embodiment shown, sleeve valve 10 comprises a design similar to that illustrated in FIGS. 3 and 5 and described above, which description is incorporated herein. Sleeve valve 10 gives sprinkler head 200 a third degree of freedom. Specifically, sleeve component 10 is capable of regulating the characteristics of delivery of fluid 2, namely the velocity, pressure, geometry and volume of fluid 2. In operation, sleeve valve 10 may be controlled to further vary the point of fluid delivery. For example, if sleeve 38 were in a partially opened position, the delivery location of fluid 2 within an arbitrarily shaped area would be different than if sleeve 38 were in a fully opened position. As such, controlling sleeve 38 to move back and forth across the fluid opening effectively functions to modify the geometry of the fluid delivery and subsequent delivery point of fluid 2.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited, except in the specification. Accordingly, the scope of the invention should be determined solely by the appended claims and their legal equivalents, rather than by the descriptions and examples given above.

What is claimed and desired to be secured by Letters Patent is:

1. A flow force compensated sleeve valve comprising:
   an elongate body having an outer surface and including a lumen for receiving a fluid and an associated fluid pressure therein and for defining a flow path of said fluid;
   at least one fluid flow port formed through said outer surface and in fluid connection with said lumen; and
   a sleeve slidably disposed about said outer surface and configured to displace across said fluid flow port to precisely regulate fluid emission through said fluid flow port, said sleeve comprising:
   an outer sleeve surface,
   an inner sleeve surface,
   a sidewall extending from said inner sleeve surface, and
   a tapered segment extending between said sidewall and said outer sleeve surface, and being adapted to minimize contact of said fluid exiting said fluid flow port with said outer sleeve surface and sidewall of said sleeve, and to reduce the effects of low pressure acting on said sleeve as a result of said fluid exiting said fluid flow port at a high velocity, and
   said sleeve and elongate body being operably related to provide force compensation, such that those forces necessary to displace said sleeve across said fluid flow port are substantially unaffected by said fluid pressure at said fluid flow port.

2. The flow force compensated sleeve valve of claim 1, further comprising a plurality of sleeves disposed about said elongate body, said plurality of sleeves configured to displace across at least one respective fluid flow port formed through said outer surface.

3. The flow force compensated sleeve valve of claim 1, further comprising at least one seal disposed between said elongate body and said sleeve to prohibit fluid from escaping between said elongate body and said sleeve.

4. The flow force compensated sleeve valve of clam 1, wherein said sleeve includes a biasing member configured to return said sleeve to a resting position.

5. The flow force compensated sleeve valve of claim 1, wherein said sleeve is configured to displace across a plurality of fluid flow ports formed through said outer surface.

6. The flow force compensated sleeve valve of claim 1, wherein said tapered segment comprises an angle between said outer sleeve surface and said sidewall of about 30 degrees to about 60 degrees.

7. The flow force compensated sleeve valve of claim 1, wherein said fluid flow port comprises a polygonal cross-sectional geometry.

8. The flow force compensated sleeve valve of claim 1, wherein said elongate body and said sleeve comprise a generally cylindrical configuration, and wherein said sleeve is concentrically disposed about said elongate body.

9. The flow force compensated sleeve valve of claim 1, wherein said elongate body comprises a cross-sectional geometry selected from the group consisting of a polygon, a circle, and an oval.

10. The flow force compensated sleeve valve of claim 1, wherein said elongate body comprises a prismatic body.

11. The flow force compensated sleeve valve of claim 1, wherein said elongate body comprises varying cross-sectional sizes and shapes.

12. The flow force compensated sleeve valve of claim 1, wherein said fluid, when said sleeve is in at least a partially open position, is caused to be emitted in a continuous, substantially non-fractionated laminar stream.

13. The flow force compensated sleeve valve of claim 1, wherein said fluid is caused to be emitted in fractionated manner.

14. The flow force compensated sleeve valve of claim 1, further comprising powering means for displacing said sleeve back and forth over said fluid flow port to deliver said fluid in a manner selected from the group consisting of a continuous stream, a recurring bolus, an arbitrary bolus, and a combination of these.

15. The flow force compensated sleeve valve of claim 1, wherein said elongate body is stationary with respect to said sleeve.

16. The flow force compensated sleeve valve of claim 1, wherein said elongate body comprises a fixed core portion bounding a distal end of said lumen and adjacent said at least one fluid flow port.

17. The flow force compensated sleeve valve of claim 16, wherein said sleeve is slidably disposed about said fixed core portion upon closing said at least one fluid flow port, and wherein said inner sleeve surface of said sleeve seals against an outer surface of said fixed core portion.

18. The flow force compensated sleeve valve of claim 16, wherein said sleeve further comprises a protrusion extending from said upper surface for facilitating manual actuation of said sleeve.

19. The flow force compensated sleeve valve of claim 1, wherein said elongate body further comprises a nozzle juxtaposed to said fluid flow port for directing fluid flow as emitted from said fluid flow port.

20. The flow force compensated sleeve valve of claim 19, wherein said nozzle comprises a cross-sectional shape selected from the group consisting of a polygon, a circle, and an oval.

21. The flow force compensated sleeve valve of claim 1, wherein said elongate body comprises two opposing fluid flow ports positioned in-line with one another at a common axial exit location along the flow path, said fluid flow ports facilitating application of balanced, equal normal forces on said sleeve.

22. The flow force compensated sleeve valve of claim 1, wherein said elongate body and said sleeve are configured to provide a decorative fountain for generating artistic fluid emissions.

23. The flow force compensated sleeve valve of claim 1, wherein said elongate body and said sleeve are configured for use within a sprinkler head to provide non-fractionated fluid emissions.

24. The flow force compensated sleeve valve of claim 1, wherein said sleeve further comprises a deflector proximate and in contact with said fluid flow to redirect said fluid and to provide said force compensation.

25. The flow force compensated sleeve valve of claim 1, wherein said sleeve further comprises a pressure port formed therein having an opening proximate said fluid flow, said pressure port receiving said fluid therein to provide said force compensation.

26. The flow force compensated sleeve valve of claim 1, wherein said fluid flow port comprises a cross-sectional area smaller than a cross-sectional area than said lumen.

27. The flow force compensated sleeve valve of claim 1, wherein said fluid flow port is formed in a lateral orientation with respect to said elongate body.

28. The flow force compensated sleeve valve of claim 1, wherein said fluid flows through said fluid flow port in a direction selected from uni-directional or bi-directional, depending upon the direction of a fluid pressure gradient acting about said sleeve valve.

29. The flow force compensated sleeve valve of claim 1, wherein said sleeve is configured such that said fluid is unable to contact an outer sleeve surface of said sleeve.

30. The flow force compensated sleeve valve of claim 1, wherein said sleeve comprises a non-seated design.

31. A flow force compensated sleeve valve comprising:
a fluid inlet;
a thin wall enclosure extending from said fluid inlet and forming an elongated prismatic body having a lumen for receiving a fluid and an associated fluid pressure therein;
at least two opposing and complementary fluid flow ports formed through an outer surface of said prismatic body for uniformly emitting said fluid from said lumen of said prismatic body;
a sleeve disposed on said prismatic body and configured to slide about said outer surface and across said fluid flow ports, said fluid flow ports causing said fluid pressure to be equally applied to opposing and complementary areas of said sleeve allowing said sleeve to maintain a continuous coaxial relationship with said prismatic body, said sleeve comprising an outer sleeve surface, an inner sleeve surface, a sidewall, and a tapered segment extending between said sidewall and said outer sleeve surface configured to minimize contact of said outer sleeve surface and said sidewall with said fluid exiting said fluid flow port, and to reduce the effects of low pressure acting on said sleeve as a result of said fluid exiting said fluid flow port at a high velocity,
said sleeve and said fluid flow ports operably related to provide force compensation, such that forces necessary to displace said sleeve across said fluid flow port are substantially unaffected by said fluid pressure at said fluid flow ports.

32. A flow force compensated sleeve valve comprising:
an elongate body having an outer surface and including a lumen for receiving a fluid and an associated fluid pressure therein and for defining a flow path of said fluid;
at least one fluid flow port formed within said elongate body, said fluid flow port in fluid connection with said lumen; and
a sleeve slidably disposed about said outer surface and configured to displace across said fluid flow port to precisely regulate fluid emission through said fluid flow port, said sleeve comprising:
an outer sleeve surface,
an inner sleeve surface,
a sidewall extending from said inner sleeve surface, and
a tapered segment extending between said sidewall and said outer sleeve surface, and being adapted to minimize contact of said fluid exiting said fluid flow port with said outer sleeve surface and sidewall of said sleeve, and to reduce the effects of low pressure acting on said sleeve as a result of said fluid exiting said fluid flow port at a high velocity, and
said sleeve and elongate body being operably related to provide force compensation, such that those forces necessary to displace said sleeve across said fluid flow port are substantially unaffected by said fluid pressure at said fluid flow port.

* * * * *